(12) United States Patent
Sonogi

(10) Patent No.: US 10,649,705 B2
(45) Date of Patent: May 12, 2020

(54) MEMORY CONTROL APPARATUS AND RESOURCE MANAGEMENT METHOD FOR MEMORY CONTROL APPARATUS TO PROCESS PDL DATA

(71) Applicant: CANON KABUSHIKI KAISHA, Tokyo (JP)

(72) Inventor: Katsutoshi Sonogi, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/064,080

(22) Filed: Mar. 8, 2016

(65) Prior Publication Data

US 2016/0269590 A1 Sep. 15, 2016

(30) Foreign Application Priority Data

Mar. 10, 2015 (JP) .................................. 2015-047100

(51) Int. Cl.
*G06F 3/12* (2006.01)
*G06F 12/00* (2006.01)

(52) U.S. Cl.
CPC ............ *G06F 3/1248* (2013.01); *G06F 3/122* (2013.01); *G06F 3/1279* (2013.01); *G06F 3/1284* (2013.01); *G06F 12/00* (2013.01)

(58) Field of Classification Search
CPC ..................................................... G06F 3/1248
See application file for complete search history.

(56) References Cited

U.S. PATENT DOCUMENTS

| | | | | |
|---|---|---|---|---|
| 5,465,165 A * | 11/1995 | Tanio | .................... | G06K 15/00 345/419 |
| 5,471,564 A * | 11/1995 | Dennis | .................. | G06F 3/1296 358/1.11 |
| 2001/0021979 A1* | 9/2001 | Ito | ......................... | G06T 1/0021 713/189 |
| 2001/0043354 A1* | 11/2001 | Miyake | .................. | G06K 15/02 358/1.15 |
| 2004/0100656 A1* | 5/2004 | Kuroki | .................. | G06F 3/1205 358/1.16 |

(Continued)

FOREIGN PATENT DOCUMENTS

JP 2009-220457 A 10/2009

*Primary Examiner* — Nicholas Pachol

(74) *Attorney, Agent, or Firm* — Canon USA, Inc., IP Division

(57) ABSTRACT

When the type of PDL data is switched, a resource that is already developed cannot be used. A memory control apparatus configured to process received PDL data includes a developing unit configured to develop the received PDL data in a first memory area, and develop a resource to be used by the PDL data in a second memory area, a determination unit configured to determine whether stored activation information is a first value or a second value, and a control unit configured to perform control for releasing the first memory area and deleting the resource developed in the second memory area, in a case where the activation information is determined to be the first value, and configured to release the first memory area and not deleting the resource developed in the second memory area, in a case where the activation information is determined to be the second value.

10 Claims, 5 Drawing Sheets

(56) References Cited

U.S. PATENT DOCUMENTS

| | | | | |
|---|---|---|---|---|
| 2006/0055975 A1* | 3/2006 | Toda | ............... | H04N 1/00347 |
| | | | | 358/1.16 |
| 2006/0290955 A1* | 12/2006 | Suzuki | ............... | G06K 15/02 |
| | | | | 358/1.9 |
| 2008/0198391 A1* | 8/2008 | Suzuki | ............... | G06K 15/02 |
| | | | | 358/1.9 |
| 2009/0027723 A1* | 1/2009 | Arai | ............... | G06F 3/1204 |
| | | | | 358/1.15 |
| 2011/0060982 A1* | 3/2011 | Mizutani | ............... | G06K 15/02 |
| | | | | 715/234 |
| 2012/0224208 A1* | 9/2012 | Tokumoto | ............... | G06K 15/1822 |
| | | | | 358/1.13 |
| 2014/0368888 A1* | 12/2014 | Takeishi | ............... | G06K 15/1871 |
| | | | | 358/3.26 |

* cited by examiner

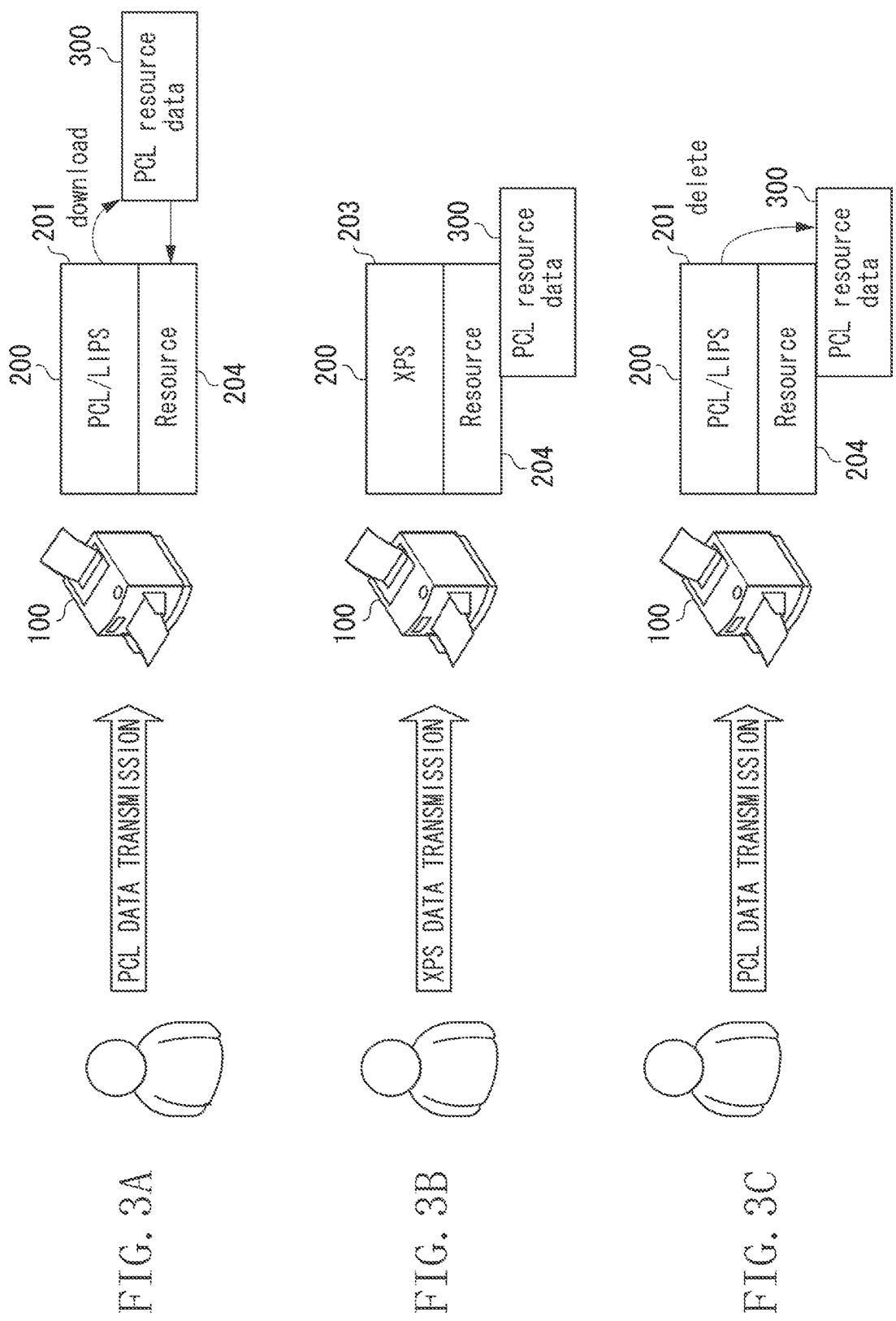

MEMORY CONTROL APPARATUS AND RESOURCE MANAGEMENT METHOD FOR MEMORY CONTROL APPARATUS TO PROCESS PDL DATA

BACKGROUND OF THE INVENTION

Field of the Invention

The present disclosure generally relates to memory control and, more particularly, to a memory control apparatus, and a resource management method for a memory control apparatus.

Description of the Related Art

In recent years, products supporting two or more page description languages (PDLs) at a low-end image-forming apparatus have been increasing. The PDLs to be supported include Printer Control Language (PCL), Portable Document Format (PDF), and eXtended Markup Language paper specification (XML paper specification, or XPS). The PDLs use different analysis methods and rending methods, and thus each need work memory. Therefore, a configuration where PDLs can be operated with less work memory by sharing the work memory has been studied.

In a conventional technique, work memory is secured for each of PDLs at the time of activation, and when an interrupt occurs during analysis of a PDL, the work memory for another PDL is used. PDL jobs can be printed with a smaller work memory capacity, by performing processing while switching to the work memory for another PDL (discussed in, for example, Japanese Patent Application Laid-Open No. 2009-220457).

There is also studied a method for executing activation and deactivation to release or secure a memory space in the work memory every time each PDL job changes the type of a PDL. This allows a reduction in size of the work memory for activation of PDLs.

However, in the conventional technique, there is a problem in a resource management method in switching a PDL when two or more PDLs are installed.

For example, according to the specifications of the PCL, all pieces of resource data are deleted in activation processing at power OFF/ON of an image generation apparatus. According to the specifications of the PCL, resource data from power ON to power OFF is stored, and a resource cannot be passed on after power OFF/ON.

In the method for sharing the work memory, activation processing is necessary at the timing when the PDL is switched. Therefore, all pieces of PCL resource data are deleted, when the PDL is switched. This causes such a problem that, if the PDL is switched, even if the power is not turned OFF/ON, there is no file in a resource area and thus text or an image is not rendered, when a job using PCL resource data is fed again by a user.

In other words, the specifications of the PCL, specifically, the storage of the resource data from power ON to power OFF, cannot be satisfied.

In this way, in the conventional technique, although processing to save resource data temporarily to an external storage area is performed, whether the resource data is deletable cannot be determined since no determination is made as to power OFF/ON.

SUMMARY OF THE INVENTION

According to an aspect of the present disclosure, a memory control apparatus configured to process received PDL data includes a developing unit configured to develop the received PDL data in a first memory area, and develop a resource to be used by the PDL data in a second memory area, a determination unit configured to determine whether stored activation information is a first value or a second value, and a control unit configured to perform control for releasing the first memory area and deleting the resource developed in the second memory area, in a case where the activation information is determined to be the first value, and configured to release the first memory area and not deleting the resource developed in the second memory area, in a case where the activation information is determined to be the second value.

Further features of the present disclosure will become apparent from the following description of exemplary embodiments with reference to the attached drawings.

BRIEF DESCRIPTION OF THE DRAWINGS

FIGS. 3A, 3B, and 3C are memory map diagrams each illustrating a work memory state.

DESCRIPTION OF THE EMBODIMENTS

Exemplary embodiments of the present disclosure will be described in detail below with reference to the drawings.
<Description of System Configuration>
<System Configuration>

Figure 1:
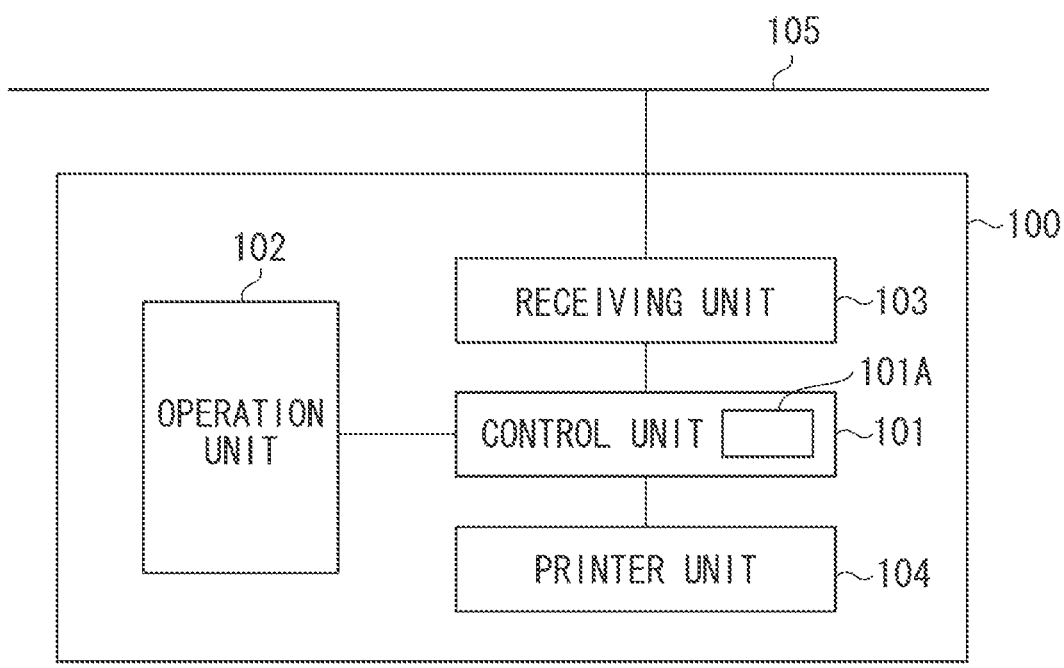
FIG. 1 is a block diagram illustrating an image-forming apparatus to which a memory control apparatus is applied.

FIG. 1 is a block diagram illustrating a configuration of an image-forming apparatus to which a memory control apparatus according to a first exemplary embodiment is applied. The image-forming apparatus to which the memory control apparatus is applied will be described below as an example.

In FIG. 1, an image-forming apparatus 100 includes a control unit 101, an operation unit 102, a receiving unit 103, and a printer unit 104. The operation unit 102 includes components such as a power switch and a control panel. The receiving unit 103 is a piece of hardware capable of receiving a print command through a line 105, and is configured of a known communications interface. As used herein, the term "unit" generally refers to any combination of software, firmware, hardware, or other component, such as circuitry, that is used to effectuate a purpose.

The control unit 101 includes a central processing unit (CPU), which may include one or more processors, a random access memory (RAM) 101A, a read only memory (ROM), and a nonvolatile memory. The nonvolatile memory is, for example, a hard disk drive (HDD) or a flash ROM. The control unit 101 can execute processing illustrated in FIG. 5. The ROM stores a program for executing the processing illustrated in FIG. 5. The CPU loads this program into the RAM 101A and executes the loaded program as appropriate, thereby executing the processing, according to a procedure of a flowchart illustrated in FIG. 5. The RAM 101A provides work memory to be used by the CPU in data processing.

The printer unit 104 is a known print engine. The printer unit 104 may use toner, or may use ink. The printer unit 104 may be any type of engine if the engine can form an image on a sheet.

<Configuration of Work Memory of Activated PDL>

Figure 2A:
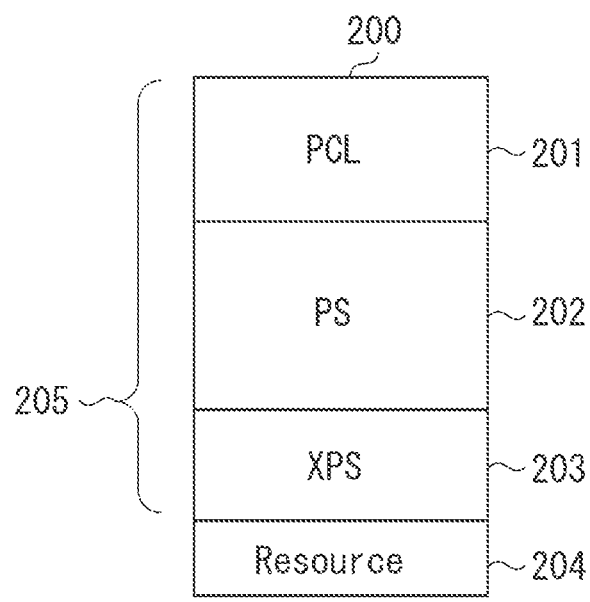
FIGS. 2A and 2B are memory map diagrams each illustrating a memory control.
Figure 2B:
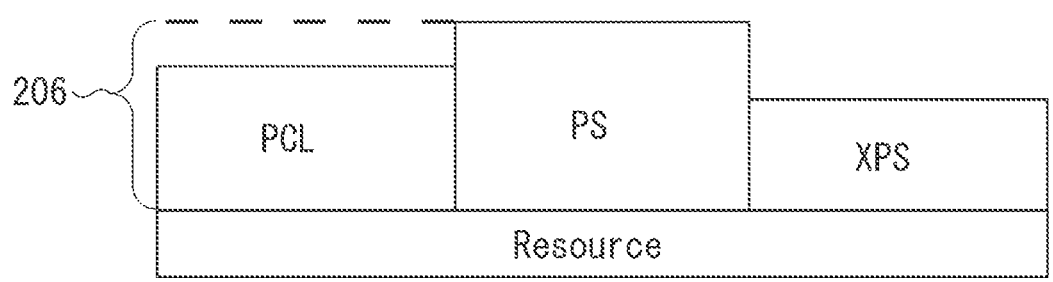

FIG. 2A is a memory map diagram illustrating a conventional memory control, and FIG. 2B is a memory map diagram illustrating a memory control of the present exemplary embodiment. Specifically, FIG. 2A illustrates a configuration of the conventional work memory for PDL, and FIG. 2B illustrates a configuration of the work memory for PDL according to the present exemplary embodiment.

In FIG. 2A, a work memory 200 is an area secured on the RAM 101A of the control unit 101. The work memory 200 includes a work memory 201 for Printer Control Language (PCL), a work memory 202 for PostScript (PS), a work memory 203 for eXtended Markup Language paper specification (XML paper specification, or XPS), and a resource area 204 for storing resource data. The control unit 101 uses the work memory 200, by formatting a work memory size 205 of the work memory 200 for each PDL at a time of the power ON of the image-forming apparatus 100.

In FIG. 2A, the work memory for all PDLs is developed in the work memory 200 and therefore, there is no need for the control unit 101 to format the work memory 200 even if processing of a PDL is switched on the way. In the present exemplary embodiment, instead of developing the work memory for all PDLs in the work memory 200, the control unit 101 needs to format the work memory 200 according to the type of PDL data transmitted from a user, as illustrated in FIG. 2B. Therefore, as illustrated in FIG. 2B, a work memory size 206 necessary for the work memory 200 is smaller than the work memory size 205. The control unit 101 deletes the format of the work memory 200 and the resource data in the resource area 204, at the time of switching the PDL.

<Description of PCL>

The PCL to be used in the present exemplary embodiment will be described. The PCL is a language developed by Hewlett-Packard (HP) Company for LaserJet products. The PCL uses a special control code, which is called "escape character (EC)", for a command for processing text or an image.

In the present exemplary embodiment, the control unit 101 has a module for analyzing a PCL command, thereby performing analysis and rendering based on print data specified by the PCL command. The PCL command has a function of storing resource data registered by the user, in the resource area 204 of the image-forming apparatus 100. The resource data includes a download font, a macro, a pattern image, and a symbol set. Once PCL resource data is registered, the image-forming apparatus 100 can use this data in the subsequent PCL data. Further, the specifications of the PCL include deletion of the resource data stored in the RAM area, when the image-forming apparatus 100 is powered OFF/ON.

<Method for Storing PCL Resource Data and Problem in Activating PCL>

FIGS. 3A to 3C are memory map diagrams each illustrating a state of the work memory of the RAM 101A illustrated in FIG. 1. More specifically, FIG. 3A illustrates a way of storing PCL resource data when PCL data is transmitted. FIG. 3B illustrates a state of the work memory 200 when a PDL type is subsequently changed, and FIG. 3C illustrates a state thereafter.

Figure 4A:
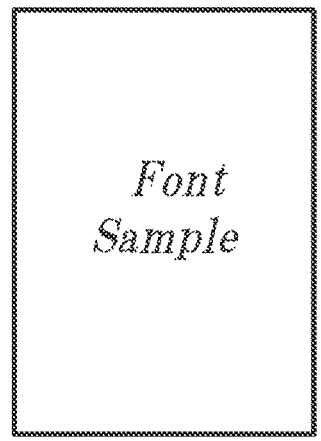
FIGS. 4A and 4B are diagrams each illustrating a text output result obtained by a printer unit.
Figure 4B:
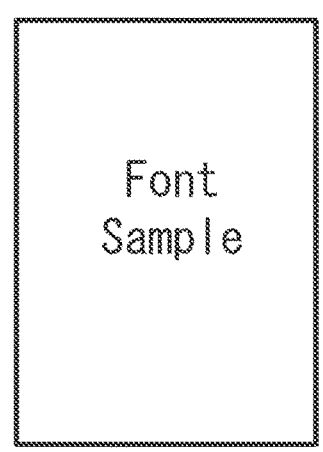

FIGS. 4A and 4B are diagrams each illustrating a text output result obtained by the printer unit 104 illustrated in FIG. 1. More specifically, FIG. 4A illustrates a result when the image-forming apparatus 100 outputs text, by using PCL resource data 300 registered by the user.

On the other hand, FIG. 4B illustrates a result when the image-forming apparatus 100 outputs text stored in the RAM 101A of the control unit 101, without using the PCL resource data 300 registered by the user.

A problem when the PCL resource data 300 is deleted at the timing when the PDL is switched in the present exemplary embodiment will be described below referring to FIGS. 3A, 3B, and 3C, and FIGS. 4A and 4B. The work memory 200 is a memory area secured in the RAM 101A.

FIG. 3A illustrates a state where the control unit 101 uses the work memory 200 when the PCL data is transmitted from the user to the image-forming apparatus 100. In FIG. 3A, the work memory 200 is already formatted for the PCL. In FIG. 3A, the control unit 101 determines the PCL resource data 300 specified in the PCL data transmitted from the user, and stores the PCL resource data 300 in the resource area 204.

The PCL resource data 300 is data that is registered by the user as PCL resource data, such as a download font, a macro, a pattern image, and a symbol set. The PCL resource data 300 is managed as data including an identification (ID) number specified by the user.

Therefore, if the ID number defined by the user is included in PCL data transmitted from the user after the PCL resource data 300 is registered by the user, the control unit 101 acquires the data from the resource area and uses the acquired data.

In a configuration illustrated in FIG. 3A, the control unit 101 can print the text by using the PCL resource data 300 registered in the resource area 204 by the user, as illustrated in FIG. 4A.

FIG. 3B illustrates a state of the work memory 200 when XPS data is transmitted from the user. When the PDL type is changed from the PCL to the XPS, the control unit 101 releases the work memory 201 for the PCL.

Next, the control unit 101 formats the work memory 200 for the XPS. The control unit 101 can start XPS analysis processing by executing this formatting. Therefore, the control unit 101 starts analyzing the XPS data, by developing the work memory 203 provided for the XPS, in the work memory 200. The PCL resource data 300 at this moment remains in a state of being registered in the resource area 204 by the control unit 101 in FIG. 3A.

Next, FIG. 3C illustrates a state of the work memory 200 when the PCL data is transmitted again from the user after the state in FIG. 3B.

Upon confirming that the PDL type is changed from the XPS to the PCL based on print data, the control unit 101 releases the work memory 203 provided for the XPS. Next, the control unit 101 formats the work memory 200 for the PCL. By executing this formatting, the control unit 101 deletes the PCL resource data 300 from the resource area 204 after developing the work memory 201 for the PCL.

This is because the control unit 101 may delete the PCL resource data 300, when determining that switching the PDL is the same processing as the processing at the time of power ON. The reason for this is that the image-forming apparatus 100 supports a PCL function of deleting the PCL resource data 300 when a deletion instruction is provided by the user or when the image-forming apparatus 100 is powered OFF/ON.

In a configuration illustrated in FIG. 3C, when the PCL data using the PCL resource data 300 is transmitted from the user, the control unit 101 performs control as follows. The control unit 101 attempts to refer to the PCL resource data 300 for the PCL in the resource area 204, but fails and thus finds no text registered by the user. Therefore, the control unit 101 uses text (a font) stored in the RAM 101A. As a result, the image-forming apparatus 100 obtains a text print result illustrated in FIG. 4B, not using a font illustrated in FIG. 4A that is a font desired by the user, which is a problem. Therefore, in the present exemplary embodiment, processing of deleting the PCL resource data is controlled as follows.

<Method for Deleting PCL Resource Data>

Figure 5:
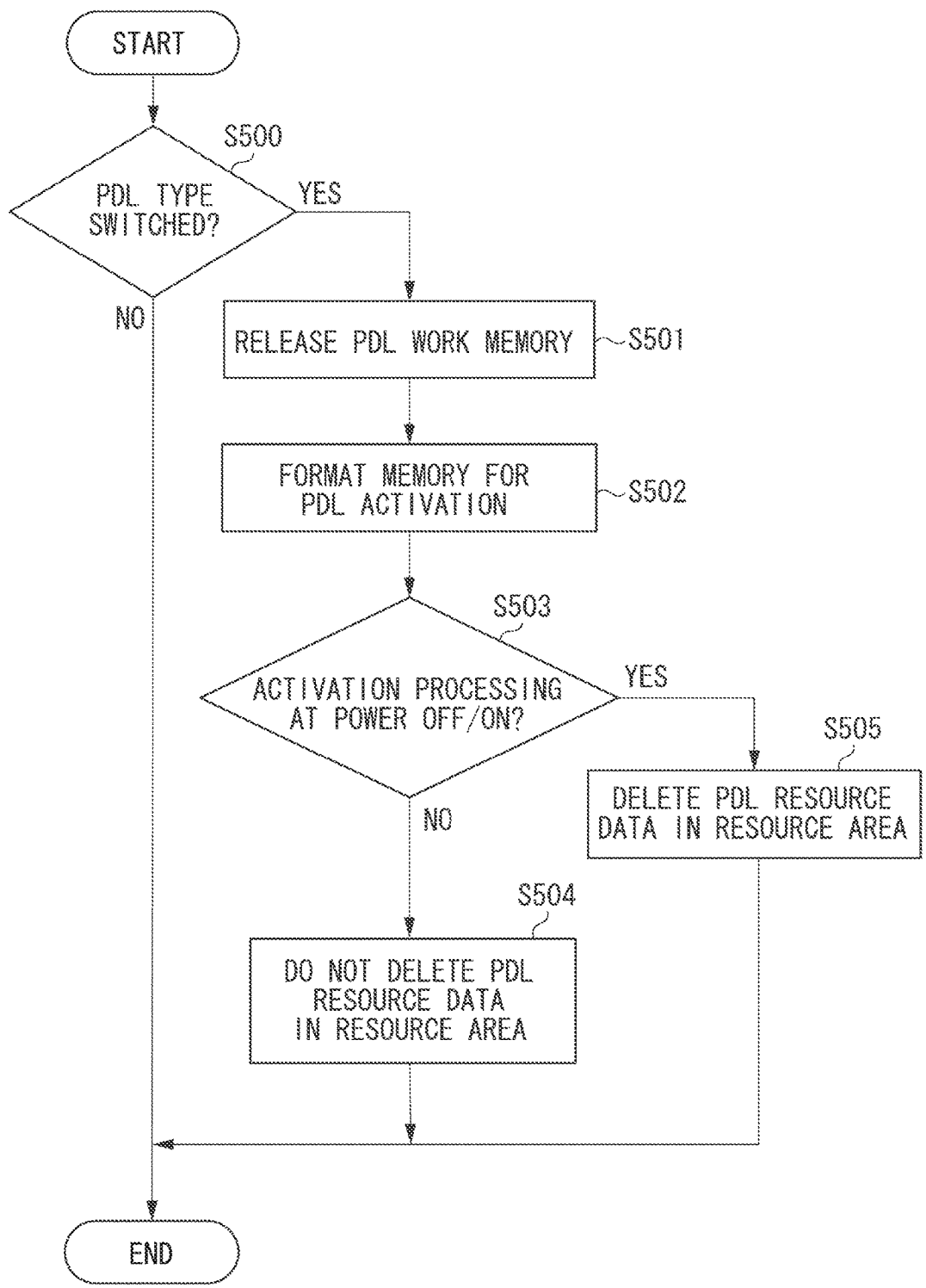
FIG. 5 is a flowchart illustrating a resource management method for a memory control apparatus.

FIG. 5 is a flowchart illustrating a resource management method for the memory control apparatus according to the present exemplary embodiment. This is a memory control example in which the control unit 101 illustrated in FIG. 1 does not delete the PCL resource data 300 in activation processing at the time of switching the PDL. The CPU of the control unit 101 executes a stored control program, thereby implementing each step.

In step S500, the control unit 101 determines a language type of input print data, thereby determining whether switching the PDL is necessary. Here, a switching method when the control unit 101 switches from one PDL to the PCL will be described as an example, but it is not limited thereto. The control unit 101 may switch this PDL to another type of PDL.

In step S500, when the control unit 101 determines that the PCL is not activated in the work memory 200 (YES in step S500), the operation proceeds to step S501. On the other hand, in step S500, when the control unit 101 determines that the PCL is using the work memory 200 (NO in step S500), the control unit start an analysis of the received print data, without formatting the work memory 200.

In step S501, the control unit 101 releases a PDL memory area (a first memory area) in the work memory 200. In step S502, the control unit 101 starts formatting the first memory area of the work memory 200 for the PCL analysis.

In step S503, at the time of performing the activation processing for the PCL analysis, the control unit 101 determines whether this activation processing is the activation processing at the time of power OFF/ON, based on the value of an activation number stored to indicate the activation processing at the time of switching the PDL. A list of PDL activation numbers in the following Table 1 includes numbers to be used by the control unit 101 in determination at the time of activating the PCL. Here, the activation number is an example of activation information.

TABLE 1

List of PDL Activation Numbers

| PDL type | Activation number |
|---|---|
| PCL activation processing at power OFF/ON | 001 |
| PCL activation processing at switching PDL | 002 |

An activation number "001" (a first value) corresponds to PCL activation processing at the time of power OFF/ON, and an activation number "002" (a second value) corresponds to PCL activation processing at the time of switching PDL.

In the present exemplary embodiment, the control unit 101 holds information indicating whether the activation corresponds to the activation at the time of power OFF/ON, on the RAM 101A, as inside information. The control unit 101 sets "001" (the first value) as the initial value of the activation number. The control is performed so that the initial activation processing is determined to be the PCL activation processing at the time of power OFF/ON. The activation number "001" is a value associated with a state where a power state is switched from an OFF state to an ON state. The activation number "002" (the second value) is a value associated with switching of the type of the PDL data.

To determine that the activation processing is the second or subsequent activation processing, the control unit 101 sets "002" as the activation number. Here, the activation of the PCL is notified using the activation number, but this is not limited thereto in the present exemplary embodiment, and a value other than numbers or a text string may be used.

The activation numbers for each PDL are prepared for two items, i.e., power OFF/ON and switching PDL. However, it is not limited thereto in the present exemplary embodiment, and other activation cases may be added if any. Alternatively, the activation number 001 for the PDL may be used by the operation unit 102 notifying the control unit 101 of power ON caused by user operation.

When the control unit 101 determines that the activation number is the first value in step S503, i.e., when the control unit 101 determines that the activation processing corresponds to the activation processing at the time of power OFF/ON (YES in step S503), the operation proceeds to step S504. On the other hand, when the control unit 101 determines that the activation number is the second value, i.e., when the control unit 101 determines that the activation processing corresponds to the activation processing at switching PDL (NO in step S503), the operation proceeds to step S505.

In step S504, the control unit 101 deletes the PCL resource data 300 in the resource area 204 (a second memory area) during the activation processing, and ends this processing.

On the other hand, in step S505, the control unit 101 does not delete the PCL resource data 300 in the resource area 204 during the activation processing, and ends this processing.

In the present exemplary embodiment, there is described the way of determining whether to delete the PCL resource data 300 when the PDL type is switched, in the image-forming apparatus 100 having such a configuration that the work memory 200 is shared for each PDL.

By executing the control procedure illustrated in FIG. 5, the control unit 101 can activate the PCL without deleting the PCL resource data 300 from the work memory 200, even in the case illustrated in FIG. 3C.

Therefore, even if the data including the PCL resource data is transmitted from the user, the image-forming apparatus 100 can perform text printing using the data in the resource area 204 intended by the user as illustrated in FIG. 4A, without producing the text printing result illustrated in FIG. 4B.

When the present exemplary embodiment is implemented, even if the image-forming apparatus 100 has saving memory, two or more PDLs can be installed on the image-forming apparatus 100. Moreover, it is possible to solve such a problem that the PCL resource data registered by the user is deleted when the PDL is switched.

The present disclosure may be applied to a system including a plurality of devices, or may be applied to an apparatus including one device. The present disclosure may be applied to, for example, a scanner, a printer, a personal computer (PC), a copier, a multifunction peripheral, and a facsimile.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-047100, filed Mar. 10, 2015, which is hereby incorporated by reference herein in its entirety.

What is claimed is:

1. A data processing apparatus comprising:
one or more memories storing instructions; and
one or more processors that execute the instructions to cause the data processing apparatus to:
receive first page description language (PDL) commands;
interpret the first received PDL commands by using a first memory area, wherein resource data to be referenced in interpretation of the first received PDL commands is stored in a second memory area;
receive second PDL commands; and
perform control for releasing the first memory area and reserving a third memory area to be used for interpreting the received PDL commands without deleting the resource data stored in the second memory area, in a case where a type of the second received PDL commands is different from a type of the first interpreted PDL commands.

2. The data processing apparatus according to claim 1, wherein the instructions further cause the data processing apparatus to update stored activation information from a first value to a second value, in response to switching of types of the received PDL commands.

3. The data processing apparatus according to claim 1, wherein an initial value of activation information is a first value.

4. The data processing apparatus according to claim 1, wherein the resource data includes any of a download font, a macro, a pattern image, and a symbol set to be used by the PDL commands.

5. The data processing apparatus according to claim 1, wherein the instructions further cause the data processing apparatus to perform control for deleting the resource data stored in the second memory area, in a case where a power state of the data processing apparatus is changed from an OFF state to an ON state.

6. A resource management method for a data processing apparatus, the resource management method comprising:
receiving first page description language (PDL) commands;
interpreting the first received PDL commands by using a first memory area, wherein resource data to be referenced in interpretation of the first received PDL commands is stored in a second memory area;
receiving second PDL commands; and
performing control for releasing the first memory area and reserving a third memory area to be used for interpreting the received PDL commands without deleting the resource data stored in the second memory area, in a case where a type of the second received PDL commands is different from a type of the first interpreted PDL commands.

7. The resource management method according to claim 6, further comprising updating stored activation information from a first value to a second value, in response to switching of types of the received PDL commands.

8. The resource management method according to claim 6, wherein an initial value of activation information is a first value.

9. The resource management method according to claim 6, wherein the resource data includes any of a download font, a macro, a pattern image, and a symbol set to be used by the PDL commands.

10. The resource management method according to claim 6, further comprising performing control for deleting the resource data stored in the second memory area, in a case where a power state of the data processing apparatus is changed from an OFF state to an ON state.

* * * * *